Patent Number: 6,031,938
Date of Patent: *Feb. 29, 2000

United States Patent
Kajiwara

[54] IMAGE ENCODING APPARATUS WITH SELECTIVE MARKOV AND PREDICTIVE CODING

[75] Inventor: Hiroshi Kajiwara, Inagi, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/635,521

[22] Filed: Apr. 22, 1996

[30] Foreign Application Priority Data

Apr. 26, 1995 [JP] Japan ................................. 7-101976
Jun. 5, 1995 [JP] Japan ................................. 7-137923

[51] Int. Cl.[7] ................................. G06K 9/36; G06K 9/46
[52] U.S. Cl. ................................. 382/239; 382/238; 382/246
[58] Field of Search ................................. 341/51, 107, 76; 348/394, 411, 397, 409, 410; 358/261.2, 430; 382/238, 239, 247, 244, 246

[56] References Cited

U.S. PATENT DOCUMENTS

| | | | |
|---|---|---|---|
| 4,363,036 | 12/1982 | Subramaniam | 358/261.2 |
| 4,542,411 | 9/1985 | Imanaka et al. | 358/430 |
| 4,870,695 | 9/1989 | Gonzales et al. | 382/238 |
| 4,992,889 | 2/1991 | Yamagami et al. | 358/430 |
| 5,406,279 | 4/1995 | Anderson et al. | 341/51 |
| 5,475,501 | 12/1995 | Yagasaki | 358/426 |
| 5,524,067 | 6/1996 | Miyake et al. | 382/238 |
| 5,703,799 | 12/1997 | Ohta | 364/725 |
| 5,710,826 | 1/1998 | Osawa et al. | 382/238 |

*Primary Examiner*—Amelia Au
*Assistant Examiner*—Timothy M. Johnson
*Attorney, Agent, or Firm*—Fitzpatrick. Cella, Harper & Scinto

[57] ABSTRACT

A pixel which is one pixel prior to a pixel to be coded x in image data is defined as a specific pixel a, and differences (b–a) and (c–a) between each of pixel data of neighboring pixels b and c and pixel data of the specific pixel a are calculated. The differences (b–a) and (c–a) are compared to a predetermined value Th1, and if both of the differences (b–a) and (c–a) are less than the predetermined value Th1, a difference (x–a) between pixel data of the pixel to be coded and the pixel data of the specific pixel is encoded by Markov model coding on the basis of the difference (x–a) and the differences (b–a) and (c–a). Whereas, if at least one of the differences (b–a) and (c–a) is not less than the predetermined value Th1, then the pixel to be coded is encoded by predictive coding on the basis of an average of the pixel data of the specific pixel a and the neighboring pixel b, $\{(a+b)/2\}$ and an error of the average with respect to the actual pixel data of the pixel to be coded x.

7 Claims, 17 Drawing Sheets

FIG. 2

|   |   |   |   |
|---|---|---|---|
|   |   |   |   |
|   |   | b | c |
|   | a | x |   |

FIG. 3

| $x - (a + b) / 2$ | CODE |
|---|---|
| −15 | 1111111111111110 |
| −14 | 11111111111110 |
| −13 | 111111111110 |
| ⋮ | |
| −1 | 01 |
| 0 | 00 |
| 1 | 10 |
| ⋮ | |
| 14 | 1111111111110 |
| 15 | 111111111111110 |

FIG. 4

| STATES | | -15 | ..... | -1 | 0 | 1 | ..... | 15 |
|---|---|---|---|---|---|---|---|---|
| b-a | c-a | | | | x-a | | | |
| -2 | -2 | 11111111 | ..... | 00 | 10 | 110 | ..... | 11111110 |
| | -1 | 11111111 | ..... | 01 | 00 | 10 | ..... | 11111110 |
| | 0 | | | | | | | |
| | 1 | | | | | | | |
| | 2 | | | | | | | |
| -1 | -2 | | | | | | | |
| | -1 | | | | | | | |
| | 0 | | | | | | | |
| | 1 | | | | | | | |
| | 2 | | | | | | | |
| 0 | ... | | | | | | | |
| 1 | ... | | | | | | | |
| 2 | ... | | | | | | | |

FIG. 6

| STATE | | x-a | | | | | | | | | |
|---|---|---|---|---|---|---|---|---|---|---|---|
| b-a | c-a | -4 | -3 | -2 | -1 | 0 | 1 | 2 | 3 | 4 | OB |
| -2 | -2 | 1110 | 10 | 00 | 01 | 110 | 1110 | 1111110 | 11111110 | 11111111 | 111110 |
|  | -1 | 11110 | 110 | 10 | 00 | 01 | 11110 | 111110 | 11111110 | 11111111 | 111110 |
|  | 0 |  |  |  |  |  |  |  |  |  |  |
|  | 1 |  |  |  |  |  |  |  |  |  |  |
|  | 2 |  |  |  |  |  |  |  |  |  |  |
| -1 | -2 |  |  |  |  |  |  |  |  |  |  |
|  | -1 |  |  |  |  |  |  |  |  |  |  |
|  | 0 |  |  |  |  |  |  |  |  |  |  |
|  | 1 |  |  |  |  |  |  |  |  |  |  |
|  | 2 |  |  |  |  |  |  |  |  |  |  |
| 0 | ... |  |  |  |  |  |  |  |  |  |  |
| 1 | ... |  |  |  |  |  |  |  |  |  |  |
| 2 | ... |  |  |  |  |  |  |  |  |  |  |

FIG. 7

| x − a | CODE |
|---|---|
| −15 | 11111111110 |
| −14 | 111111110 |
| −13 | 1111110 |
| ⋮ | |
| −5 | 01 |
| 5 | 00 |
| ⋮ | |
| 14 | 11111110 |
| 15 | 1111111110 |

FIG. 9

|   |   |   |   |
|---|---|---|---|
|   |   |   |   |
|   | c | b |   |
|   | a | x |   |

FIG. 10

| x − a − b + c | CODE |
|---|---|
| −30 | 1111111111111110 |
| −29 | 111111111111110 |
| −28 | 11111111110 |
| ⋮ | |
| −1 | 01 |
| 0 | 00 |
| 1 | 10 |
| ⋮ | |
| 29 | 1111111111110 |
| 30 | 11111111111110 |

FIG. 11

| STATE | | | PIXEL x TO BE CODED | | | | | | |
|---|---|---|---|---|---|---|---|---|---|
| a | b | c | 0 | 1 | 2 | 3 | 4 | ...... | 15 |
| 0 | 0 | 0 | | | | | | | |
| | ... | | | | | | | | |
| | ... | | | | | | | | |
| 7 | 3 | 7 | 111111 | 111110 | 111101 | 1110 | 111100 | ...... | 1111110 |
| 7 | 3 | 8 | | | | | | | |
| 7 | 3 | 9 | | | | | | | |
| 7 | 4 | 5 | | | | | | | |
| 7 | 4 | 6 | | | | | | | |
| 7 | 4 | 7 | | | | | | | |
| 7 | 4 | 8 | | | | | | | |
| 7 | 4 | 9 | | | | | | | |
| 7 | 5 | 0 | | | | | | | |
| 7 | 5 | 1 | | | | | | | |
| | ... | | | | | | | | |
| | ... | | | | | | | | |
| 15 | 15 | 15 | | | | | | | |

FIG. 14

| STATE | | | SYMBOL (x−a) | | | | | |
|---|---|---|---|---|---|---|---|---|
| | b−a | c−a | −15 | −14 | ... | 0 | 14 | 15 |
| S(−15,−15) | −15 | −15 | 0.3 | 0.3 | ... | 0.1 | ... | ... |
| S(−15,−14) | −15 | −14 | 0.3 | 0.3 | ... | 0.2 | ... | ... |
| ... | ... | 0 | 0.1 | | ... | 0.5 | ... | |
| S(−15,0) | ... | ... | | | ... | | | |
| S(−15,15) | −15 | 15 | | | ... | | | |
| S(−14,−15) | −14 | −15 | | | ... | | | |
| ... | ... | ... | | | | | | |
| S(x,y) | x | y | | | | | | |
| ... | ... | 15 | | | | | | |
| S(−14,15) | −14 | ... | | | | | | |
| ... | ... | ... | | | | | | |
| S(0,0) | 0 | 0 | | | | | | |
| .......... | | | | | | | | |
| S(15,15) | 15 | 15 | | | | | | |

| STATE | b–a | c–a | –15 | –14 | ...... | 0 | ...... | 15 |
|---|---|---|---|---|---|---|---|---|
| | | | | | | | x–a | |
| S(–15,–15) | –15 | –15 | 110 | 1110 | ...... | 11111111 | ...... | |
| S(–15,–14) | –15 | –14 | 110 | 1110 | ...... | 11111110 | ...... | |
| ...... | | | | | | | | |
| S(–15, 0) | –15 | 0 | 11111111 | | | | | |
| ...... | | | | | | 01 | | |
| S(15,15) | 15 | 15 | | | | | | |

IMAGE ENCODING APPARATUS WITH SELECTIVE MARKOV AND PREDICTIVE CODING

BACKGROUND OF THE INVENTION

The present invention relates to an image encoding method and apparatus for encoding image data by reversible (lossless) coding.

Conventionally, there are several known lossless image encoding methods, such as the Markov model coding and the predictive coding. Among the lossless image encoding methods, in the Markov model coding, a pixel to be coded whose luminance is determined on the basis of the states of m neighboring pixels (reference pixels) around the pixel to be coded is regarded as a model of m Markov information sources, and the pixel to be coded is encoded by using different entropy coding methods (e.g., Huffman coding, arithmetic codings) in accordance with the states of its m neighboring pixels. According to this Markov model coding method, high encoding efficiency is expected.

Further, in the predictive coding, a pixel value of a pixel to be coded is predicted on the basis of the neighboring pixels around the pixel to be coded, and the difference between the predicted pixel value and the actual pixel value is encoded by entropy coding. This predictive coding is featured by relative simplicity in encoding processes.

In the aforesaid Markov model coding, it is necessary to generate a Markov table including occurrence probability of symbols in each state of the neighboring pixels. Therefore, when the Markov model coding is applied to an image expressed in many tones, the size of the Markov table causes a problem. For example, when the Markov model coding which refers to n neighboring pixels is applied to image data expressed in 256 tones, then the number of possible states is 256 to the n-th power. The number n of the reference pixels should be increased in order to lower entropy, however, since the number of possible states increases as a geometric progression, it becomes very difficult to lower the entropy in the Markov coding. Therefore, the number of states are generally decreased by regarding states in which the occurrence numbers of symbols are low as a single state or by regarding states in which occurrence probability distributions of symbols resemble each other as a single state, for example. However, complicated processes are necessary for doing so.

In contrast, in predictive coding, the encoding processing is simple, however, there is a drawback in that high encoding efficiency is not expected.

SUMMARY OF THE INVENTION

The present invention has been made in consideration of the above situation, and has as its object to provide an image encoding method and apparatus capable of realizing high encoding efficiency.

It is another object of the present invention to provide an image encoding method and apparatus capable of encoding image data efficiently by using both of the Markov model coding and the predictive coding.

It is still another object of the present invention to provide an image encoding method and apparatus capable of downsizing a table used in the Markov model coding.

It is still another object of the present invention to provide an image encoding method and apparatus capable of downsizing a table used in the image encoding method and of encoding image data efficiently.

It is still another object of the present invention to provide an image encoding method and apparatus capable of encoding image data efficiently without performing complicated processes for decreasing the number of states of image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is an explanatory view illustrating positions of pixels according to the first embodiment;

FIG. 3 is a schematic view of a code table used in the first and second embodiments;

FIG. 4 is a schematic view of a Markov table according to the first embodiment;

FIG. 6 shows an example of a Markov table according to the second embodiment;

FIG. 7 shows an example of a code table according to the second embodiment;

FIG. 9 is an explanatory view showing relationship between a pixel to be coded and positions of reference pixels;

FIG. 10 shows an example of a code table according to the third embodiment;

FIG. 11 shows an example of a Markov table according to the third embodiment;

FIG. 14 is a schematic view of a Markov table generated in the fourth and fifth embodiments;

FIG. 16 is an example of a Huffman code table according to the fourth embodiment;

DETAILED DESCRIPTION OF THE PREFERRED EMBODIMENTS

Preferred embodiments of the present invention will be described in detail in accordance with the accompanying drawings. It should be noted that a monochromatic image of 16 tones is used as an image to be encoded in the embodiments.

[First Embodiment]

FIG. 2 is an explanatory view illustrating positional relationship of pixels according to the first embodiment. In FIG. 2, x denotes the position of a pixel to be coded which is subjected to coding, a denotes a position of a specific pixel, and b and c denotes positions of reference pixels.

Figure 1:
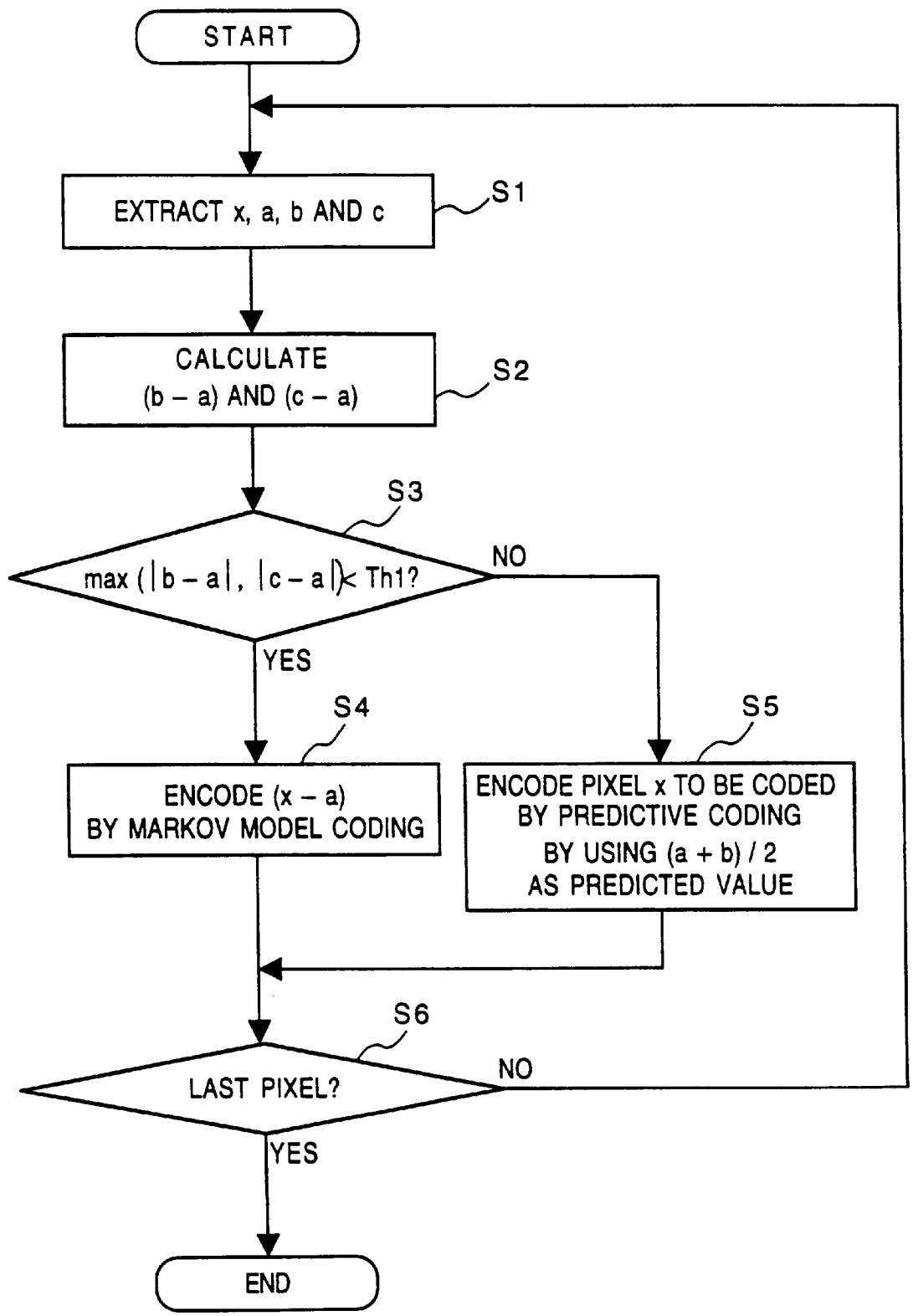
FIG. 1 is a flowchart showing an encoding processing according to a first embodiment of the present invention.

FIG. 1 is a flowchart showing an encoding processing according to the first embodiment. An operation of the first embodiment will be described below with reference to FIG. 2 and the flowchart in FIG. 1. Note that, in the following explanation, x, a, b and c are regarded as pixel values (pixel data) at the corresponding marked positions.

First at step S1 in FIG. 1, the value x of the pixel to be coded, the value a of the specific pixel, and the values b and c of the reference pixels are extracted from image data which is subjected to coding, and at step S2, the differences between the respective values b and c and the value a, namely (b−a) and (c−a), are calculated. Next, the process proceeds to step S3, where each of the absolute values of the differences (b−a) and (c−a) is compared to a threshold Th1. If at least one of the absolute values of the differences (b−a) and (c−a) is equal to or greater than the threshold Th1, the process moves to step S5 where the pixel to be coded is encoded by the predictive coding by using a value (a+b)/2 as a predicted value. Whereas, if both of the absolute values of the differences (b−a) and (c−a) are less than the threshold Th1, the process proceeds to step S4, and the difference (x−a). is encoded by the Markov model coding. After either of the processes at steps S4 and S5 is finished, then the process moves to step S6 where whether the pixel to be coded is the last pixel in the image data to be encoded or not is determined. If not, the process returns to step S1.

FIG. 3 is a schematic view of a code table used at step S5 in FIG. 1, and FIG. 4 is a schematic view of a Markov table used at step S4 in FIG. 1.

The code table shown in FIG. 3 is generated in such a manner that, when at least one of the absolute values of the differences (b−a) and (c−a) is equal to or greater than the threshold Th1, codes are assigned on the basis of the occurrence probability of difference (errors) between a predicted value by regarding (a+b)/2 and the actual value (x).

The Markov table shown in FIG. 4 is generated in such a manner that, when both of the absolute values of the differences (b−a) and (c−a) are less than the threshold Th1, codes are assigned on the basis of the occurrence probability of a difference (x−a) in each state which is defined in accordance with combinations of the differences (b−a) and (c−a).

These tables can also be made by pre-scanning an image to be encoded prior to an encoding processing, and taking statistics of pixel values of the scanned image, then making Huffman codes on the basis of the taken statistics, or by taking statistics of several kinds of images in advance, and determining a code table for general use on the basis of the taken statistics.

Here, the image encoding processing is performed by pixel in the raster scanning order. First at aforesaid step S1, the values of the pixel to be coded x, the pixel a which is one pixel prior to the pixel x, and the reference pixels b and c are extracted. Next at step S2, the differences between the respective values b and c and the value a, namely (b−a) and (c−a), are calculated. Then, the process proceeds to step S3 where each of the differences (b−a) and (c−a) is checked, and if both of the absolute values of the differences are less than the threshold Th1 (e.g., 3), then the process moves to step S5. Whereas, if at least one of the absolute values of the differences is equal to or greater than the threshold Th1, the process moves to step S5. At step S5, the predicted difference value (error) {x−(a+b)/2} is encoded in accordance with the code table shown in FIG. 3 by taking the value {(a+b)/2} as a predicted value, then at step S6, whether the pixel to be coded is the last pixel in an image to be encoded or not is determined. If so, the processing is completed, whereas if not, the process returns to step S1 and the aforesaid processes are repeated on the next-pixel.

At step S4, each state is defined by the combinations of the differences (b−a) and (c−a), and the difference (x−a) is encoded by using the Markov table shown in FIG. 4 and outputted. Next at step S6, whether the pixel to be coded is the last pixel in an image to be encoded or not is determined. If so, the processing is completed, whereas if not, the process returns to step S1 and the aforesaid processes are repeated on the next pixel.

The Markov table in the first embodiment contains the number of codes of 5×5×31, as apparent from FIG. 4. Even in a case where the code table shown in FIG. 3 which is necessary for the predictive coding is added to the above Markov table, the total size of the tables is much less then the size of a Markov table when the Markov model coding is performed in a conventional manner on the basis of three reference pixels, a, b, and c, namely, 16 to the 4-th power. Further, it is expected that the encoding efficiency drops very slightly whereas the size of the table is remarkably downsized according to the first embodiment.

[Second Embodiment]

Figure 5:
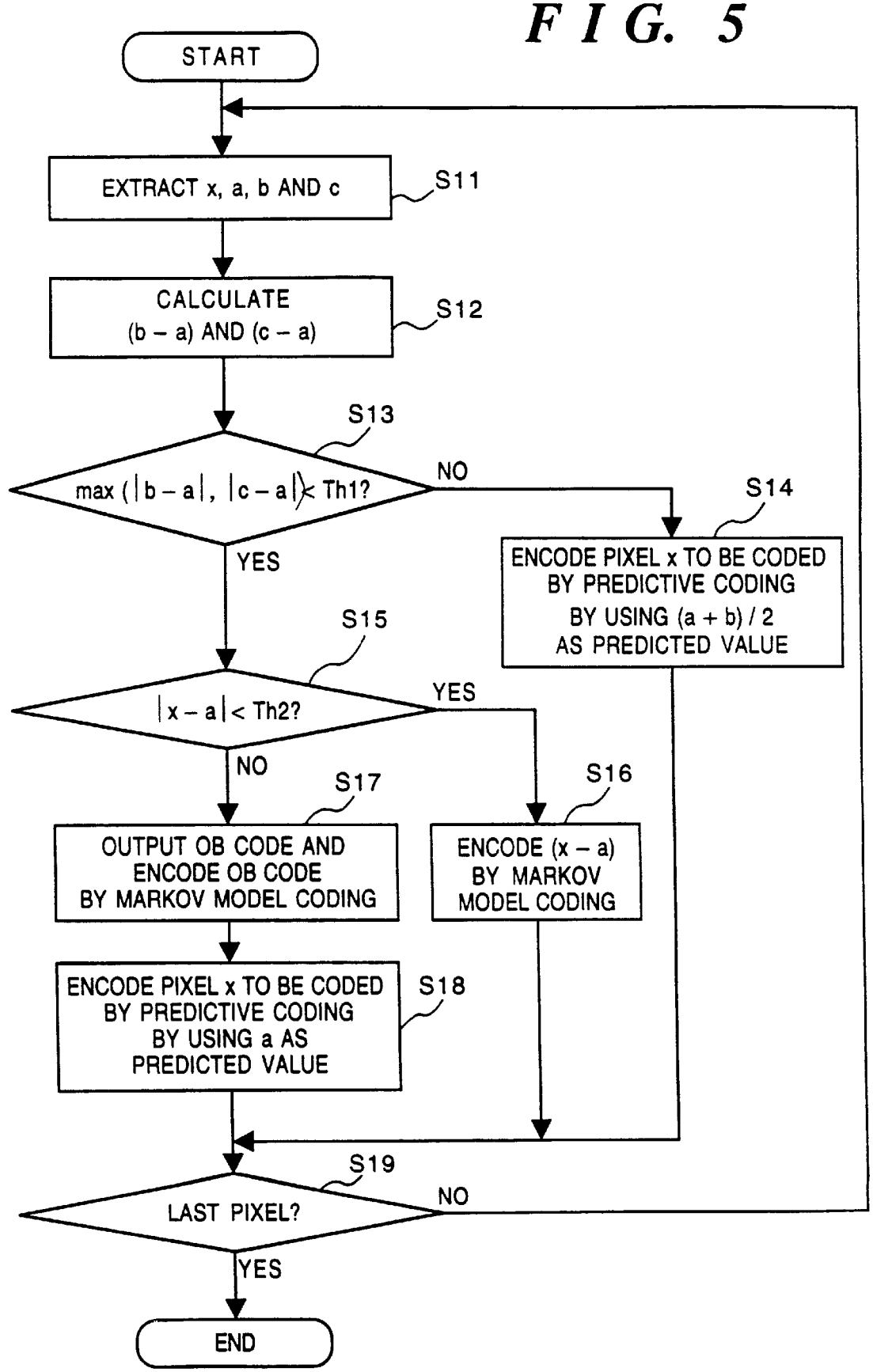
FIG. 5 is a flowchart showing an encoding processing according to the second embodiment of the present invention.

FIG. 5 is a flowchart showing an encoding processing according to a second embodiment of the present invention. In the second embodiment, a monochromatic image of 16 tones is used as an image to be encoded, and positional relationship between pixels is the same as in the first embodiment.

Referring to FIG. 5, the values of the pixel to be coded x, and the pixel a which is one pixel prior to the pixel_x, and the reference pixels b and c are extracted from an image at step S11, and at step S12, the differences between the respective values of the reference pixels b and c and the value of the specific pixel a, namely (b−a) and (c−a), are calculated. At step S13, each of absolute values of the differences (b−a) and (c−a) is compared to a threshold Th1. At step S14, when at least one of the absolute values of the differences (b−a) and (c−a) is equal to or greater than the threshold Th1, the pixel to be coded x is encoded by the predictive coding by using the value {(a+b)/2} as a predicted value. At step S15, an absolute value of a difference (x−a) is compared to a threshold Th2, and at step S16, when the absolute value of the differences (x−a) is less than the threshold Th2, the difference (x−a) is encoded by the Markov model coding. At step S17, when the absolute value of the difference (x−a) is equals to or greater than the threshold Th2, an OB code (shown in FIG. 6) which indicates that the difference (x−a) is not included in the Markov table is outputted for the Markov model coding. At step S18, the pixel to be coded x is encoded by the predictive coding by using a as a predicted value, and at step S19, whether the pixel to be coded x is the last pixel in an image to be encoded or not is determined.

FIG. 3 shows an example of a code table used at step S14, FIG. 6 shows an example of a Markov table used at steps S16 and S17, and FIG. 7 is an example of a code table used at step S18.

The code table shown in FIG. 3 is generated in such a manner that, when at least one of the absolute values of the differences (b−a) and (c−a) is equal to or greater than the threshold Th1, codes are assigned on the basis of the occurrence probability of difference (errors) between a predicted value (a+b)/2 and the actual value (x).

The Markov table shown in FIG. 6 is generated in such a manner that, when both of the absolute values of the differences (b−a) and (c−a) are less than the threshold Th1, codes are assigned on the basis of the occurrence probability of a difference (x−a) in each state which can be defined in accordance with combinations of the differences (b−a) and (c−a).

Further, the code table shown in FIG. 7 is generated in such a manner that, when both of the differences (b−a) and (c−a) are less than the threshold Th1 and the difference (x−a) is equal to or greater than the threshold Th2, codes are assigned on the basis of occurrence probability of the difference (x−a).

Note, in the second embodiment, these tables can be made by the pre-scanning an image to be encoded prior to an encoding processing, and taking statistics of pixel values, then assigning Huffman codes on the basis of the taken statistics, or by taking statistics of several kinds of images in advance, and determining a table for general use on the basis of the statistics, as in the first embodiment.

Next, the operation of the second embodiment will be described with reference to the flowchart in FIG. 5.

Here, the image encoding processing is performed by pixel in the raster scanning order. First at step S11, the values of the pixel to be coded x, and the pixel a which is one pixel prior to the pixel x, and the reference pixels b and c are extracted from the image to be encoded. Then the process proceeds to step S12 where the differences between the respective values of the reference pixels b and c and the value of the specific pixel a, namely (b−a) and (c−a), are calculated. Next at step S13, each of absolute values of the differences (b−a) and (c−a) which are calculated at step S12 is checked, and if both of the absolute values is less than the threshold Th1 (e.g., 3), the process moves to step S15, else if the process moves to step S14.

At step S14, a predicted difference (error) {x−(a+b)/2} is encoded on the basis of the code table shown in FIG. 3 by using the value (a+b)/2 as a predicted value and the obtained code is outputted, and the process moves to step S19. Whereas, at step S15, the absolute value of the difference (x−a) is compared to the threshold Th2, and if the difference (x−a) is less than the threshold Th2 (e.g., 5), the process proceeds to step S16, else if the process moves to step S17.

At step S16, each state is defined by the combinations of the-differences (b−a) and (c−a), and the difference (x−a) is encoded by using the Markov table shown in FIG. 6 and outputted. Then the process goes to step S19.

At step S17, each state is defined by the combinations of the differences (b−a) and (c−a), and the OB code which indicates that the difference (x−a) is outside of "−4"~"4" is outputted. Then the OB codes is encoded by using the Markov table shown in FIG. 6 Then the process proceeds to step S18 where the predicted difference value (x−a) is encoded by using the code table shown in FIG. 7 and outputted. After the above processes are finished, the process goes to step S19 where whether the pixel to be coded x is the last pixel in the image to be encoded or not is determined. If so, the processing is completed, whereas if not, the process returns to step S11 and the aforesaid processes are repeated on the next pixel.

The Markov table in the second embodiment contains the number of codes of 5×5×10, as apparent from FIG. 6. Even in a case where the code tables (FIGS. 3 and 7) which are necessary for the predictive coding is added to the above Markov table, the total size of the tables is much smaller then the size of a Markov table when the Markov model coding is performed in a conventional manner on the basis of three reference pixels, a, b, and c, namely, 16 to the 4th power.

[Third Embodiment]

Figure 8:
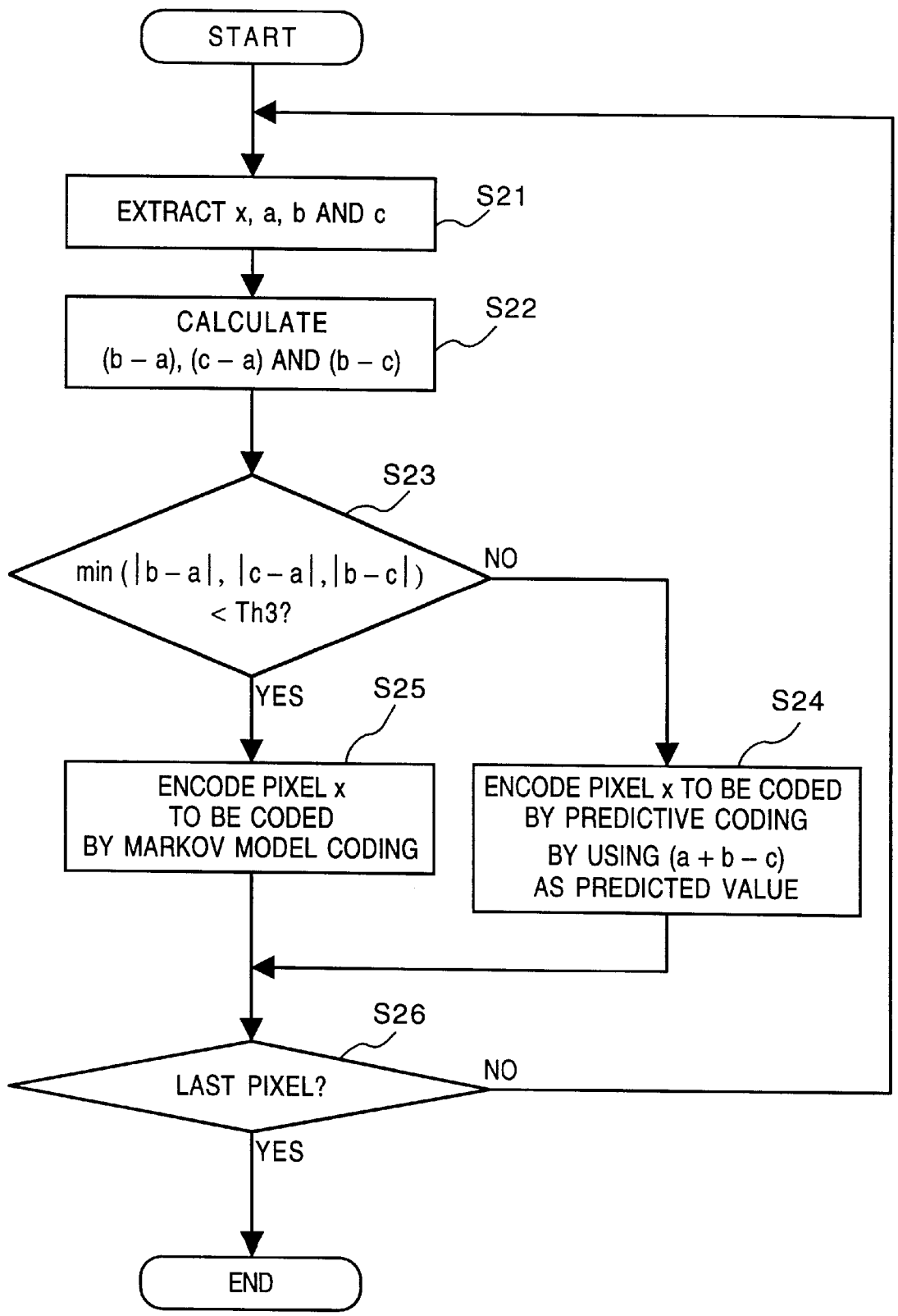
FIG. 8 is a flowchart showing an encoding processing according to a third embodiment.

FIG. 8 is a flowchart showing an encoding processing according to a third embodiment of the present invention. In the third embodiment, a monochromatic image of 16 tones is used as an image to be encoded, and the positional relationship between pixels is as shown in FIG. 9

Referring to FIG. 8, at step S21, the values of a pixel to be coded x, and reference pixels a, b and c are extracted from the image, and at step S22, the differences between the values of the reference pixels a, b and c , namely (b−a), (c−a) and (b−c), are calculated. At step S23, each of absolute values of the differences (b−a), (c−a), and (b−c) is compared to a threshold Th3. At step S24, when all of the absolute values of the differences (b−a), (c−a), and (b−c) are equal to or greater than the threshold Th3, the pixel to be coded x is encoded by the predictive coding by using the value (a+b−c) as a predicted value. At step S25, when any one of the absolute values of the differences (b−a), (c−a), and (b−c) is less than the threshold Th3, the pixel to be coded x is encoded by the Markov model coding by referring to the reference pixels a, b and c. Further, at step S26, the pixel to be coded x is determined whether it is the last pixel or not.

FIG. 10 shows an example of a code table used at step S24 in FIG. 8, FIG. 11 shows an example of a Markov table used at step S25

The code table shown in FIG. 10 is generated in such a manner that, when at least one of the absolute values of the differences (b−a), (c−a) and (b−c) is less than the threshold Th3, codes are assigned on the basis of the occurrence probability a difference (x−a−b+c) between the pixel to be coded x and a predicted value (a+b−c). The Markov table shown in FIG. 11 is generated in such a manner that, when all of the differences (b−a), (c−a) and (b−c) are equal to or greater than the threshold Th3, codes are assigned on the basis of occurrence probability of the pixel to be coded x in each state defined in accordance with combinations of the reference pixels a, b and c.

Note, in the third embodiment, these tables can be made by pre-scanning an image to be encoded prior to an encoding processing, and taking statistics of pixel values, then assigning Huffman codes on the basis of the taken statistics, or by taking statistics of several kinds of images in advance, and determining a table for general use on the basis of the taken statistics, as in the previously described embodiments.

Next, the operation of the third embodiment will be described with reference to the flowchart in FIG. 8.

In the third embodiment, the image encoding processing is also performed by pixel in the raster scanning order. First at step S21, the values of the pixel to be coded x, and the reference pixels a, b and c are extracted from the image. Then the process proceeds to step S22 where the differences between the values of the reference pixels a, b and c , namely (b−a), (c−a) and (b−c), are calculated, and at step S23, if it is determined that all of the absolute values of the differences (b−a), (c−a), and (b−c) are equal to or greater than the threshold Th3 (e.g., 2), then the process proceeds to step S24, whereas if any one of the absolute values is less than the threshold Th3, then the process moves to step S25. At step S24, the predicted value (a+b−c) is calculated from the values of the pixels a, b and c, and a difference (x−a−b+c) between the value of the pixel to be coded x and the predicted value (a+b−c) is encoded by using the code table shown in FIG. 10, and outputted.

Whereas at step S25, each state is defined by combinations of the reference pixels a, b and c, and the pixel to be coded x is encoded by using the Markov table shown in FIG. 11 and outputted. After the process at either step S24 or S25 is finished, the process moves to step S26 where it is determined that whether the pixel to be coded x is the last pixel or not. If so, the encoding processing is completed, whereas if not, the process returns to step S21 and the aforesaid processes are repeated on the next pixel.

According to the third embodiment as described above, comparing to the conventional method in which Markov model coding is performed by referring to three reference pixels, it is possible to down-size the Markov table to about half of 16 to the 4th power.

Figure 12:
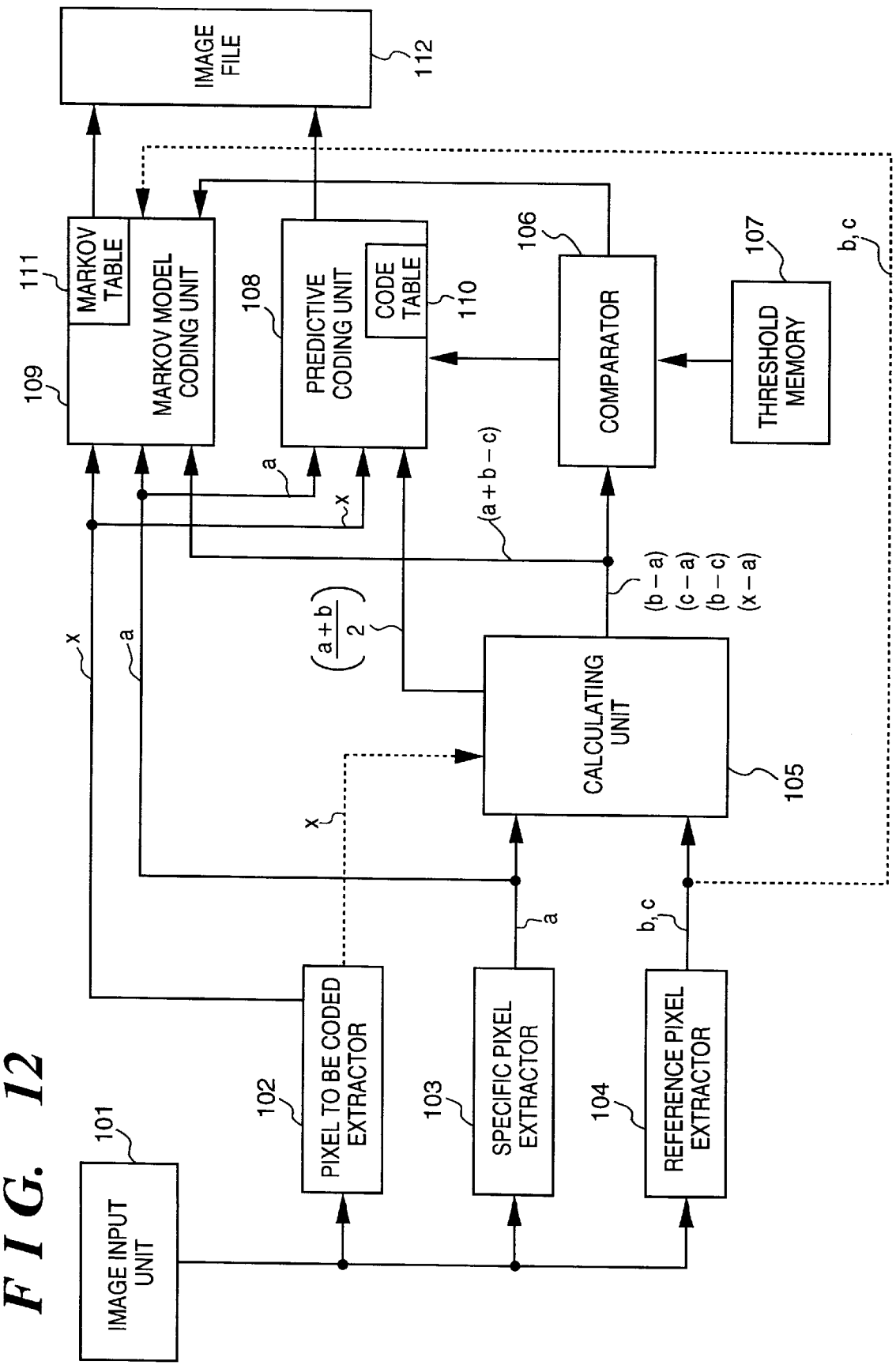
FIG. 12 is a block diagram showing a functional configuration of an image encoding apparatus of embodiments of the present invention.

FIG. 12 is a block diagram showing a functional configuration of an image encoding apparatus of the embodiments of the present invention. The FIG. 12 shows all the units and elements used in the previously described embodiments, however, some of these units elements and values may be omitted in accordance with each of the first through the third embodiments.

Referring to FIG. 12, reference numeral 101 denotes an image input unit for inputting image data, and the image data inputted from here is transferred to a pixel-of-interest extractor 102, a specific pixel extractor 103 and a reference pixel extractor 104 where a pixel to be coded x, a specific pixel a, and reference pixels b and c are extracted, respectively. Further, reference numeral 105 denotes a calculating unit which operates on pixel values (density values) inputted from the pixel-of-interest extractor 102, the specific pixel extractor 103 and the reference pixel extractor 104, then calculates (b−a), (c−a) and (b−c) as well as (a+b)/2, (a+b−c), (x−a), and so on.

Reference numeral 106 denotes a comparator which compares respective thresholds (Th1, Th2, Th3) stored in a threshold memory 107 with the calculated values inputted from the calculating unit 105. A comparison process performed at the comparator 106 corresponds to the processes at step S3 in FIG. 1, steps S13 and S15 in FIG. 5, and step S23 in FIG. 8.

Then either Markov model coding unit 109 or predictive coding unit 108 is selected on the basis of the comparison results. Reference numeral 111 denotes a Markov table used for the Markov model coding which is composed of as shown in FIG. 4, 6 or 11, for example. Further, reference numeral 110 denotes a code table used for the predictive coding which is composed of as shown in FIG. 3, 7 or 10, for example.

As shown in step S5 in FIG. 1 or step S14 in FIG. 5, the predictive coding unit 108 receives the density value (x) of the pixel to be coded x and density values (a, b) of the reference pixel b and the specific pixel a in accordance with the comparison results by the comparator 106, and the difference between the density value of the pixel to be coded x, and the average of density values {(a+b)/2} of the reference pixel b and the specific pixel a is calculated. Then, the predictive coding unit 108 encodes the pixel to be coded x by the predictive coding on the basis of a density difference {x−(a+b)/2} with reference to the code table 110 (FIG. 3).

In contrast, the Markov model coding unit 109 encodes the difference (x−a) between the pixel to be coded x and the specific pixel a on the basis of the comparison result of (b−a) and (c−a) by the comparator 106 with reference to the Markov table 111 shown in FIG. 4, as performed at step S4 in FIG. 1.

Similarly, the predictive coding unit 108 encodes a pixel to be coded by the predictive coding as shown in step S18 in FIG. 5 or step S24 in FIG. 8, and the Markov model coding unit 109 encodes a pixel to be coded by the Markov model coding as shown in steps S16 and S17 in FIG. 5 and step S25 in FIG. 8. The data which is thus encoded by either the predicted coding or the Markov model coding is stored in an image file 112 or a not-shown memory, or outputted to outside via an interface or a communication line.

According to the third embodiment as described above, by using either the Markov model coding or the predictive coding selected on the basis of the difference between the value of the pixel to be coded and the values of its neighboring pixels, it becomes possible to reduce the number of states in the Markov model coding. Consequently, the size of a Markov table which is referred upon performing Markov model coding can be down-sized, thereby saving memory space for storing the Markov table.

Next, fourth to sixth embodiments will be explained in detail in accordance with the accompanying drawings.

[Fourth Embodiment]

Figure 13:
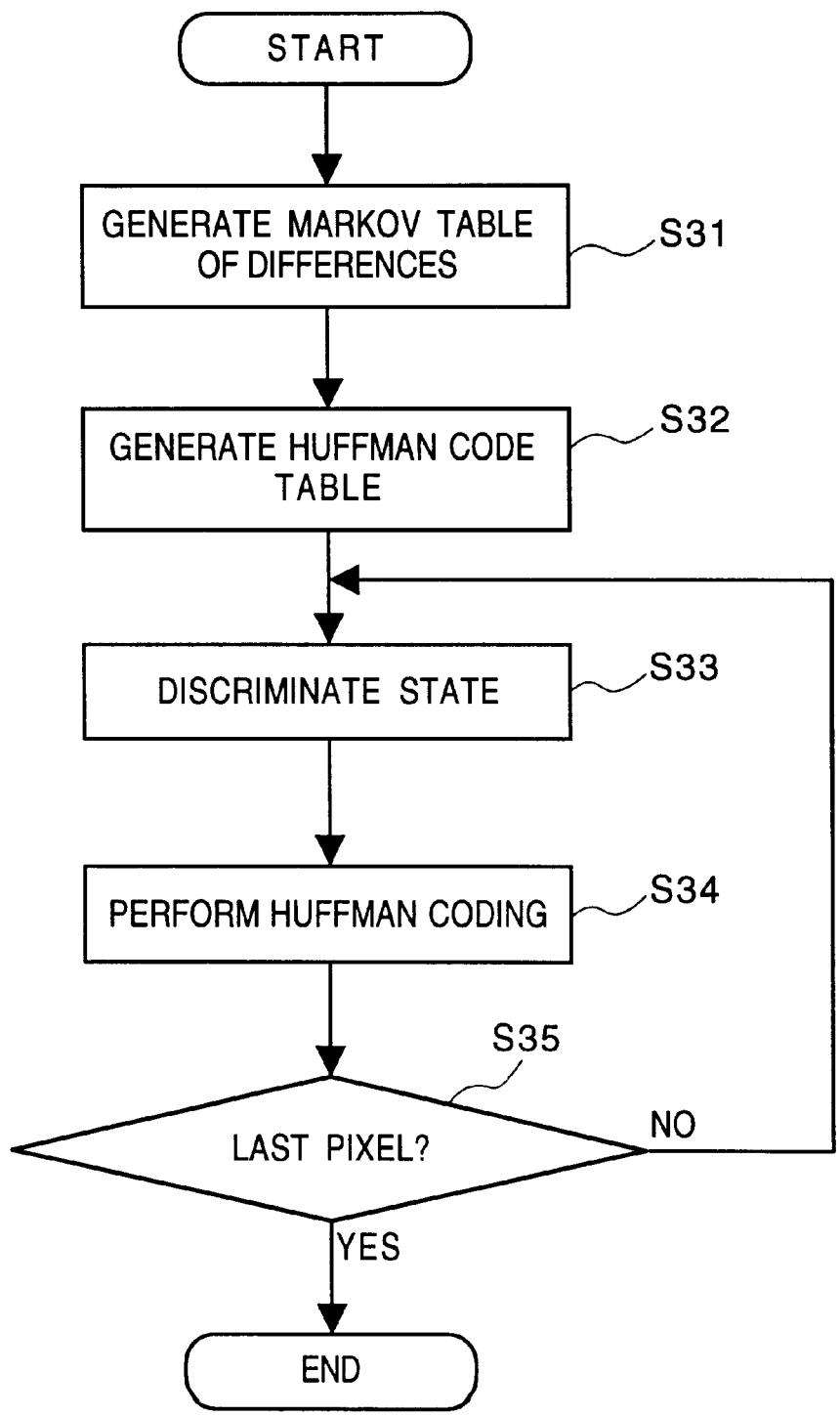
FIG. 13 is a flowchart showing an encoding processing according to a fourth embodiment.

FIG. 13 is a flowchart showing an encoding processing according to the fourth embodiment.

Referring to FIG. 13, a Markov table for a difference (x−a) is generated on the basis of the pixel to be coded x, a specific pixel a and reference pixels b and c, in input image data, which are adjacent pixels of the pixel to be coded x. Then the process proceeds to step S32 where a Huffman code table is generated on the basis of the Markov table. After the Huffman code table is generated as above, in the processes after step S33, the pixel to be coded x is encoded by the Huffman coding (step S34) on the basis of the states of the reference pixels in the input image data, and the obtained Huffman code is outputted. This process is repeated until the last pixel data of the input image data is encoded.

This encoding processing will be described below in detail.

Note, in the subsequent embodiments, the positions of pixels are defined as in FIG. 2, and a pixel a is defined as a specific pixel, then a Markov table showing occurrence probability of the difference (x−a) in each state S(b−a, c−a) which is discriminated by the differences (b−a) and (c−a) is generated.

First, states, S, are defined in accordance with calculated differences (b−a) and (c−a) by using the specific pixel a and the reference pixels b and c for all the pixels of the image to be encoded, then the number N(x−a) of occurrence of the difference (x−a) between the pixel to be coded x and the specific pixel a in each state is counted. On the basis of the counted values N(x−a) and the number MS(m, n) of occurrences of state S(m, n) (m=b−a, n=c−a), occurrence probability P (N(x−a)/MS(m, n)) is calculated, and the Markov table as shown in FIG. 14 is generated (step S31).

Figure 15:
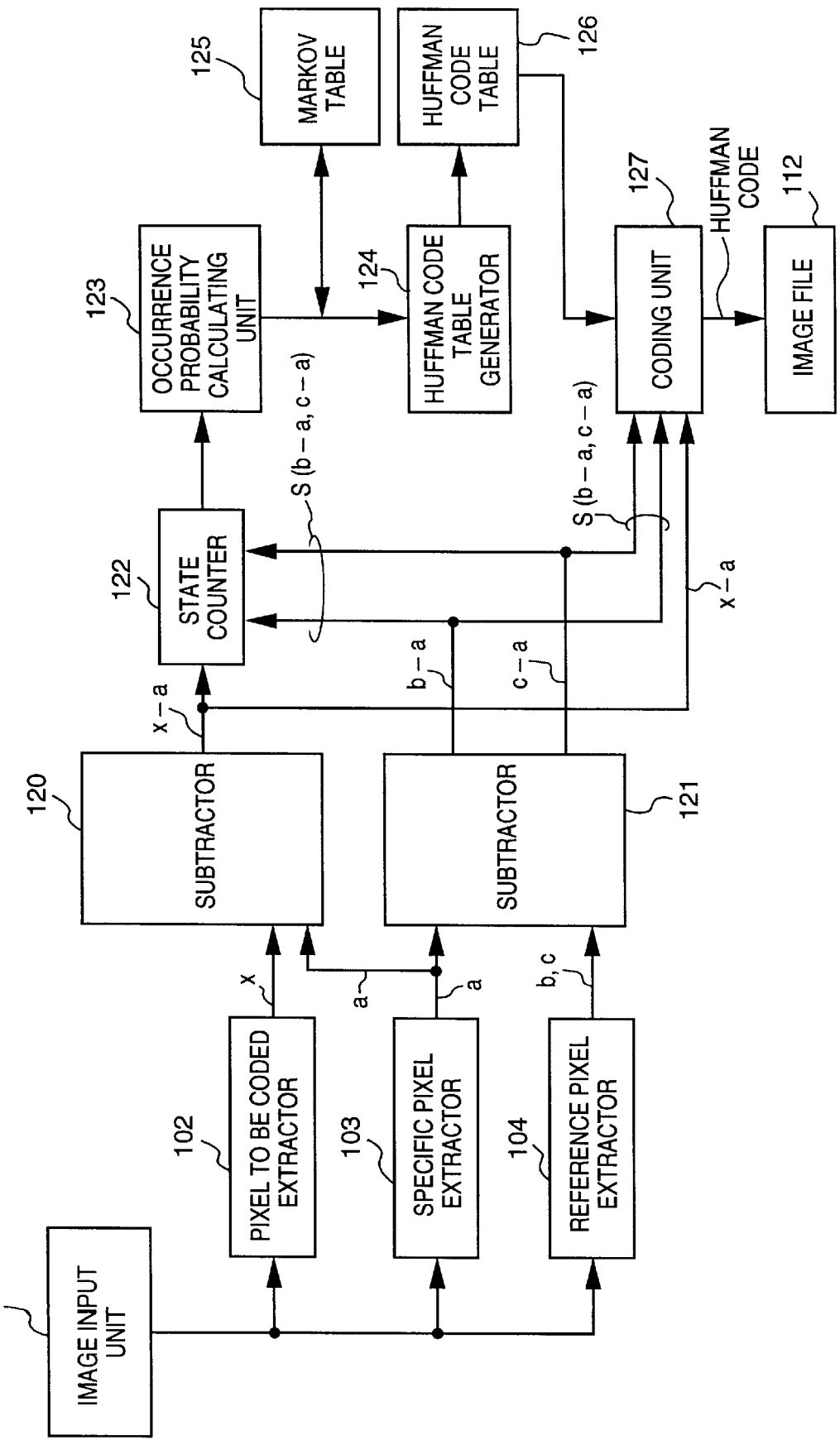
FIG. 15 is a block diagram illustrating a configuration of an image encoding apparatus according to the fourth embodiment.

FIG. 15 is a block diagram illustrating a configuration of an image encoding apparatus according to the fourth embodiment.

In FIG. 15, reference numeral 101 denotes the image input unit for inputting image data, and the image data inputted from here is transferred to the pixel-of-interest extractor 102, the specific pixel extractor 103 and the reference pixel extractor 104 where a pixel to be coded x, a specific pixel a and reference pixels b and c are extracted, respectively. Further, reference numeral 120 and 121 are subtractors, and the subtractor 120 subtracts the pixel value a inputted from the specific pixel extractor 103 from the pixel to be coded x inputted form the pixel-of-interest extractor 102 to obtain the difference (x−a). Further, the subtractor. 121 subtracts the pixel value a inputted from the specific pixel extractor 103 from the respective pixel values b and c inputted from the reference pixel extractor 104 to obtain the differences (b−a) and (c−a).

Further, reference numeral 122 denotes a state counter which counts the number N(x−a) of occurrences of the difference (x−a) outputted from the subtractor 120 in each state S(b−a, c−a) and the number of MS(m, n) of occurrences of state S(m, n) in the image. An occurrence probability calculating unit 123 calculates occurrence probabilities {N(x−a)/MS(m, n)} of the difference (x−a) in each state inputted from the state counter 122. Then a Markov table 125 as shown in FIG. 14 is generated on the basis of the occurrence probability obtained as above.

Reference numeral 124 denotes a Huffman code table generator which assigns a Huffman code to each occurrence probability of the difference (x−a) in each state by referring to the Markov table as shown in FIG. 14. It is a Huffman code table 126 that is generated as above. An example of the Huffman code table 126 is shown in FIG. 16.

When the Huffman code table 126 is generated as above, the image is sequentially scanned from the left upper end pixel and inputted. A coding unit 127 finds a Huffman code in each state on the basis of the state S(b−a, c−a) from the subtractor 121 and the difference (x−a) from the subtractor 120 with reference to the Huffman code table 126, and encodes the difference (x−a) between the pixel to be coded x and the specific pixel a and outputs the obtained code to the image file 112 (step S34 in FIG. 13). At step S35, whether the pixel applied with the above encoding processing is the last pixel of the image to be encoded or not is checked, and if so, the processing is completed, whereas if not, the above processes from step S33 are repeated on the next pixel. By performing the aforesaid processing, image data can be encoded and stored in the image file 112.

It should be noted that, in the fourth embodiment, the Markov table 125 contains the number of data of 31 to the 3rd power (=29,791) and which is about the half of the number of data contained in the conventional Markov table, namely 16 to the 4th power (=65,536) when three pixels are referred.

[Fifth Embodiment]

Figure 17:
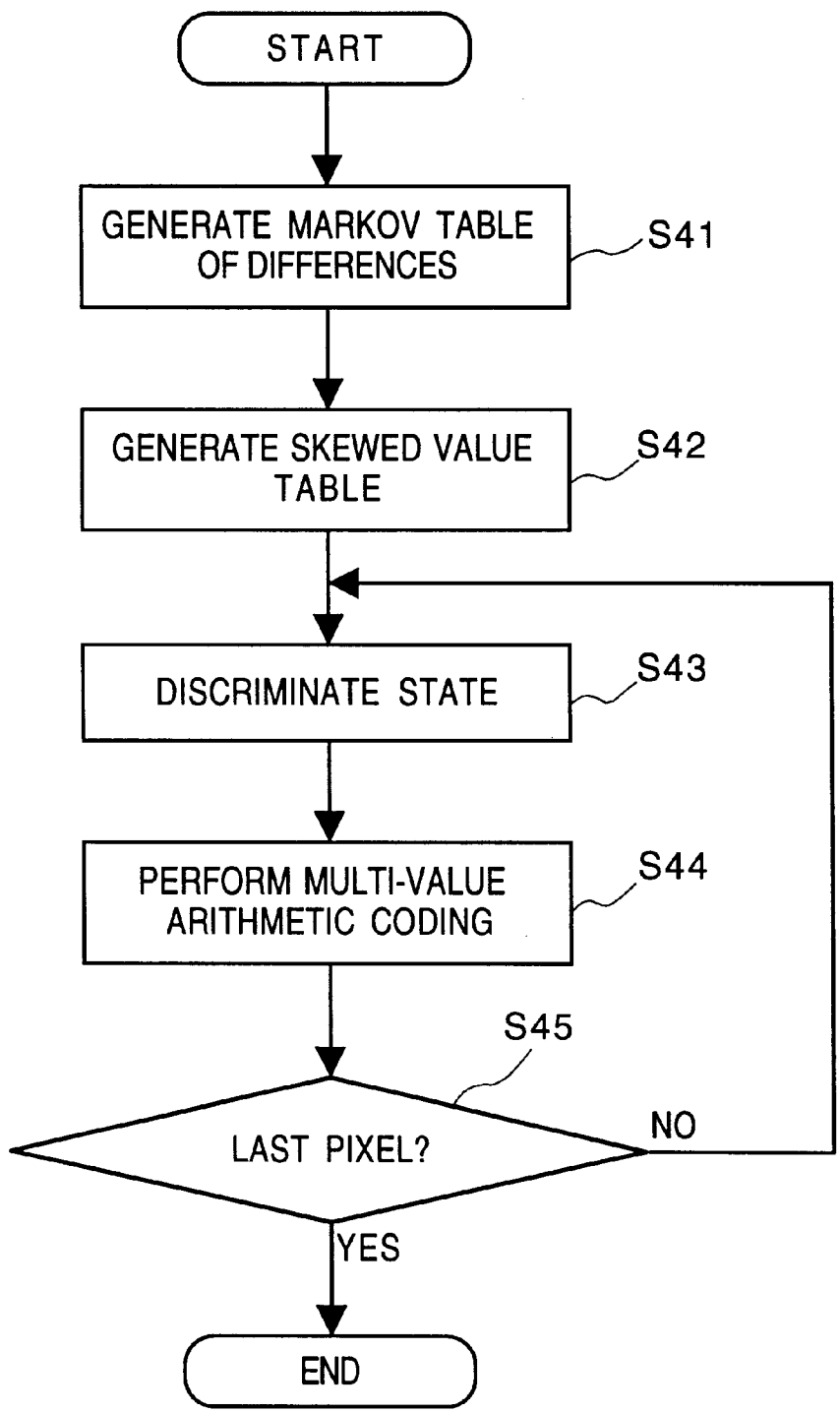
FIG. 17 is a flowchart showing an encoding processing according to the fifth embodiment.
Figure 18:
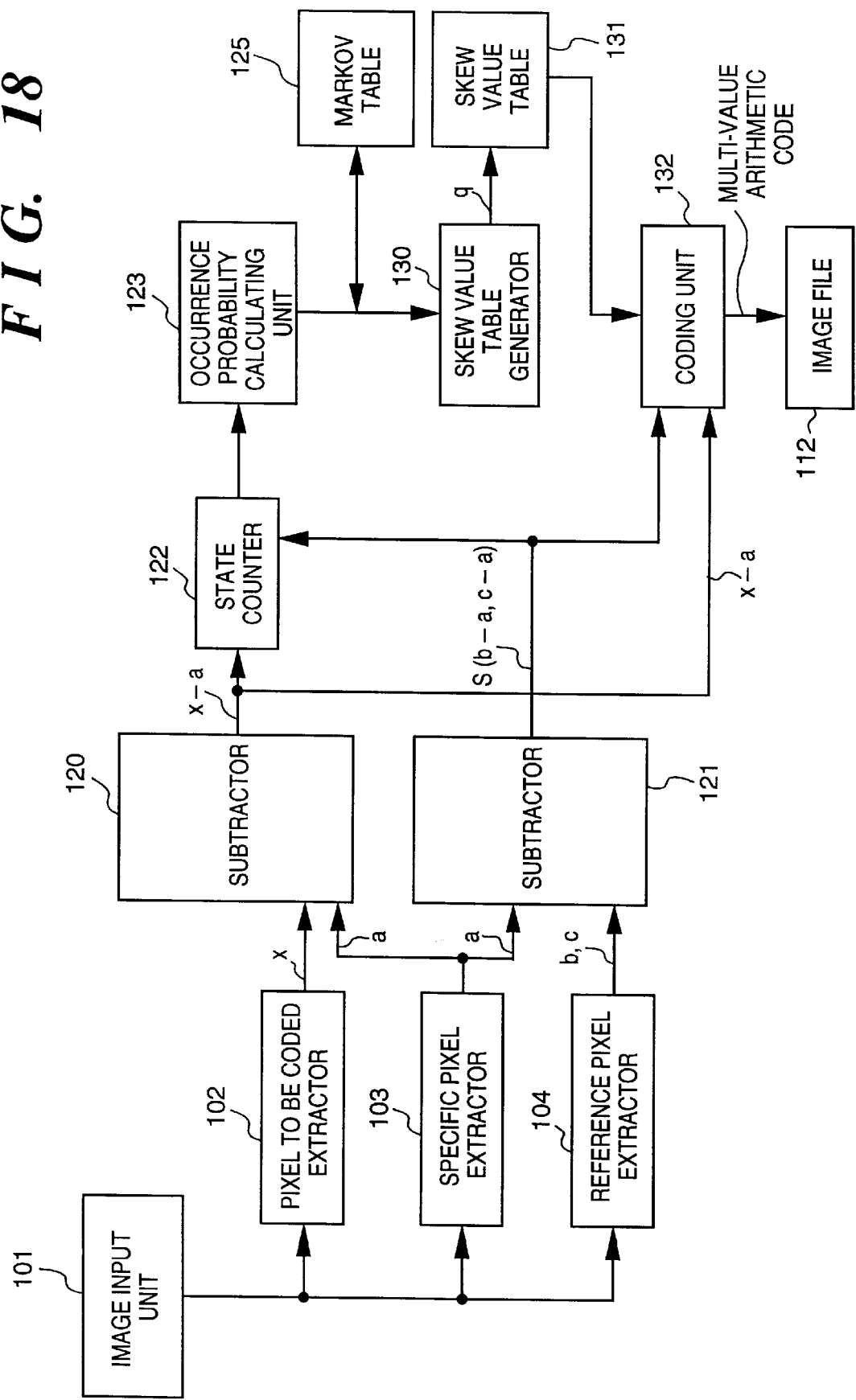
FIG. 18 is a block diagram illustrating a configuration of an image encoding apparatus according to the fifth embodiment.

FIG. 17 is a flowchart showing an encoding processing according to the fifth embodiment. FIG. 18 is a block diagram illustrating a configuration of an image encoding apparatus according to the fifth embodiment, and the same units and elements as those in FIG. 15 are referred by the same reference numerals and their explanation is omitted.

At step S41 in FIG. 17, the Markov table 125 of differences is generated as in step S31 in FIG. 13. Then the process proceeds to step S42 where a skew value table 131 (will be explained later) used in a multi-value arithmetic coding is generated. After the skew value table 131 is generated, then in the subsequent steps after step S43, each pixel of input image data is encoded by the multi-value arithmetic coding.

Similarly to the fourth embodiment, the positions of the reference pixels in the fifth embodiment are shown by a, b and c in FIG. 2, as well as discrimination of each state is performed on the basis of the differences (b−a) and (c−a). Further, image data to be encoded in the fifth embodiment is monochromatic image data of 16 tones.

In FIG. 18, similarly to the fourth embodiment, the subtractor 121 calculates the differences (b−a) and (c−a) between the respective values of the reference pixels b and c and a value of the pixel a, shown in FIG. 2, for all the pixels of image data to be encoded. Further, the subtractor 120 calculates the difference (x−a) between the value of the pixel to be coded x and the value of the specific pixel a. Then the state counter 122 discriminates states on the basis of the outputs from the subtractor 121, and counts the number N(x−a) of occurrences of the difference (x−a) in each state and the number MS(m, n) of occurrences of state S(m, n) in the image. Thereafter, the occurrence probability calculating unit 123 calculates an occurrence probability P(N(x−a)/MS (m, n)). Thus, the Markov table 125 as shown in aforedescribed FIG. 14 is generated.

Next, a skew value table generator 130 generates the skew value table 131 on the basis of the Markov table 125 after obtaining a parameter q used for approximating the P(N(x−a)/MS(m, n)) by 2 to the q-th power in the multi-value arithmetic coding.

When the skew value table 131 is generated as described above, image data obtained by sequentially scanning the image from the left upper end pixel is inputted, and the differences (b−a) and (c−a) are calculated. Thereafter, the state S(b−a, c−a) is discriminated on the basis of the calculated differences (b−a) and (c−a) (step S43 in FIG. 15). Thereafter, a skew value occurred when the difference (x−a) from the subtractor 120 occurs in the state S(b−a, c−a) is obtained by referring to the skew value table 131, then the pixel to be coded x is encoded by the multi-value arithmetic coding (step S44). This process is performed by a coding unit 132. Then, the coded pixel is checked whether it is the last pixel of the image data or not, and if so, a termination process (adding an end code) of the arithmetic coding is performed, then the encoding processing is completed. Whereas, if not, the process returns to step S43, and the same processes as described above are repeated on the next pixel. By performing the aforesaid processing, data which is obtained by performing the multi-value arithmetic coding is generated and stored in the image file 112.

[Sixth Embodiment]

Next, the sixth embodiment will be described. The sixth embodiment describes a coding process of image data performed on the basis of the Huffman code table 126 which is generated in advance in such a manner that will be described later or generated as in the fourth embodiment. Note, in the sixth embodiment, the mage data to be encoded is monochromatic image data of 256 tones.

Figure 19:
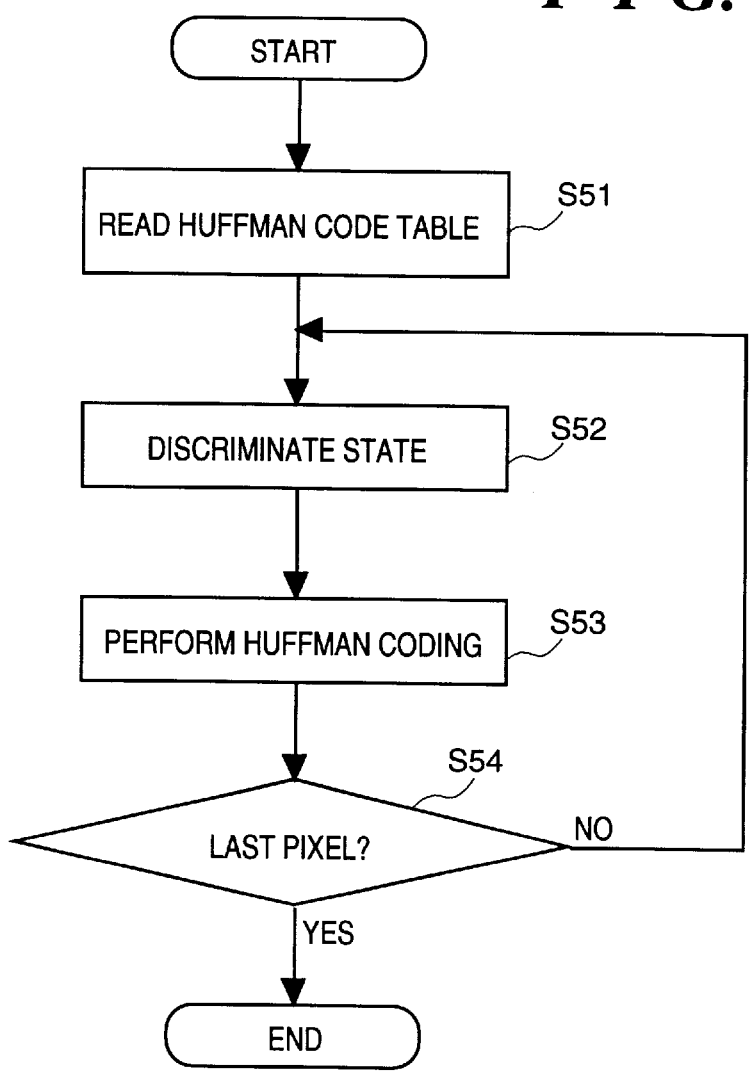
FIG. 19 is a flowchart showing an encoding processing according to a sixth embodiment.

FIG. 19 is a flowchart showing an encoding processing according to the sixth embodiment.

Referring to FIG. 19, first at step S51, the Huffman code table 126 is read, then at step S52, the state of a pixel of the image data to be encoded is discriminated. Thereafter, the process proceeds to step S53 where a Huffman code corresponding to the pixel to be coded x is determined in accordance with the difference (x−a) and the state S(b−a, c−a), and outputted.

Figure 20:
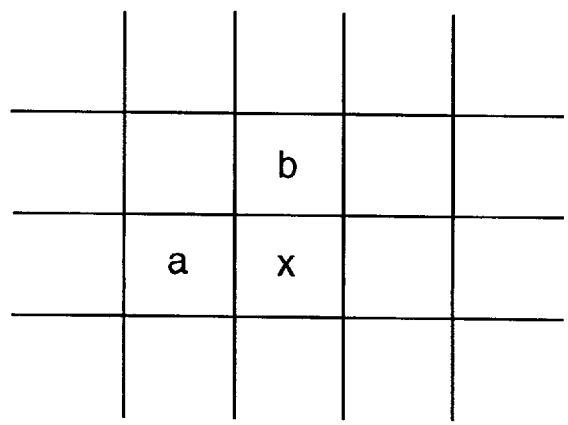
FIG. 20 is an explanatory view showing positions of reference pixels according to the sixth embodiment.

FIG. 20 is an explanatory view showing positions of reference pixels according to the sixth embodiment.

In FIG. 20, x shows the position of the pixel to be coded, and a and b show positions of pixels to be referred (reference pixels). The Markov table 125 showing occurrence possibility of the difference (x–a) is generated for each state S(b–a) based on the numbers of occurrence of the difference (x–a) and the states S(b–a).

In the sixth embodiment, the occurrence probability of the difference (x–a) between the pixel to be coded x and the reference pixel a in each state S(b–a) which is discriminated by the difference (b–a) between the reference pixels a and b, is calculated for several kinds of image data in advance. In accordance with the calculated probabilities, a Markov table 125 which can be used for various kinds of image data is generated in advance. Then, a Huffman code table 126 for general use, as described above, is generated on the basis of this Markov table 125, in advance. Finally, each pixel of the input image data can be encoded by referring to the Huffman code table 126. Thereby, when each kind of image data is to be encoded, it becomes unnecessary to generate a Markov table and a Huffman code table which are exclusively for the input image data.

In order to encode image data, the ready-made Huffman code table 126 is read at first as well as it is outputted as a part of codes (step S51).

Next, image data is sequentially scanned from the left upper end pixel, the difference (b–a) between the reference pixels a and b is calculated, and the state is discriminated on the basis of the difference (step S52). Thereafter, the process proceeds to step S53 where the difference (x–a) is encoded by the Huffman coding by referring to the Huffman code table 126 corresponding to the state S(b–a), and the coded result is outputted. At step S54, whether the processed pixel is the last pixel of the image data or not is determined, and if not, the process returns to step S52 then the aforesaid processes are repeated on the next pixel. Whereas, if the processed pixel is the last pixel, then the encoding processing is completed.

According to the sixth embodiment, the number of states is 511, and the Markov table 125 contains the number of data of 511 to the 2nd power (=261,121). This number of states is about one-128th of the number of states, i.e., 256 to the 2nd power (=65,536), in a conventional Markov model coding when two pixels are referred, and the Markov table 125 contains the number of data which is about one-64th of that in a conventional Markov table, i.e., 256 to the 3rd power (=16,777,216).

It should be noted that the present invention is not limited to the above embodiments. For example, in the above embodiments, the pixel a placed one pixel prior to the pixel to be coded x, the pixel b placed right above the pixel to be coded x, and the pixels c placed at either right or left upper position of the pixel to be coded x are used as the reference pixels, however, the positions of the reference pixels are not limited to these, and any positions are possible as far as the pixels at the positions can be used as the reference pixels.

Further, only the static Markov model coding is used in the aforesaid embodiments, however, it is possible to use the dynamic Markov model coding if another step of updating the Markov table in response to occurred symbols is added to the aforesaid encoding processing. Furthermore, the definition of states used in the Markov model coding is not limited to those explained above with reference to accompanying drawings, and the states can be defined as far as the defined states can be correctly discriminated upon decoding codes.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

According to the above embodiments, it is possible to perform different entropy coding which is suitable to each state by determining states of neighboring pixels of the pixel to be coded on the basis of the difference or differences between a single or a plurality of reference pixels and a specific pixel, generating a Markov table indicating occurrence possibility of the differences between the pixel to be coded and the specific pixels in each pixel state, and performing aforesaid entropy coding by using the generated Markov table.

Thereby, it is possible to perform the Markov model coding by considering the small number of states without performing a special process, such as reduction of image data. Accordingly, the required memory for storing the table can be reduced as well as the encoding processing can be simplified.

Further, according to the embodiment, by selectively performing the Markov model coding or the predictive coding in accordance with the difference between the pixel to be coded and its neighboring pixels, it is possible to reduce the number of states used in the Markov model coding. As a result, it is possible to reduce the size of the Markov table used during performing the Markov model coding, thereby saving memory space for storing the Markov table.

Note that these kinds of image coding can be applied to a case where a high definition image is to be compressed and stored in an image filing system for medical use, and to a case where an image is compressed to transmit it, for example. As a result, it is also possible to provide an image filing system capable of storing great many high definition images, which requires small memory capacity for filing.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to apprise the public of the scope of the present invention, the following claims are made.

What is claimed is:

1. An image encoding method of encoding image data, comprising the steps of:

generating differences between pixel data of neighboring pixels of a pixel to be coded;

selecting either Markov model coding or predictive coding which uses an operation result using pixel data of the neighboring pixels as a predicted value for encoding the pixel to be coded on the basis of magnitudes of the differences; and encoding the pixel to be coded by using either said Markov model coding or said predictive coding, on the basis of a selection result at said selecting step, wherein said Markov model coding performs different types of entropy coding in accordance with a plurality of conditions classified based on the neighboring pixels of the pixel to be coded.

2. An image encoding apparatus for encoding image data, comprising:

generating means for generating differences between pixel data of neighboring pixels of a pixel to be coded;

selecting means for selecting either Markov model coding or predictive coding which uses an operation result using pixel data of the neighboring pixels as a predicted value for encoding the pixel to be coded on the basis of magnitudes of the differences; and encoding means for encoding the pixel to be coded by using either said Markov model coding or said predictive coding, on the basis of a selection result by said selecting means, wherein said Markov model coding performs different types of entropy coding in accordance with a plurality of conditions classified based on the neighboring pixels of the pixel to be coded.

3. An image encoding apparatus for encoding image data, comprising:

extracting means for extracting an adjacent pixel of a pixel to be coded as a specific pixel and neighboring pixels of the pixel to be coded as reference pixels from the image data;

calculating means for calculating differences between respective pixel data of the reference pixels and pixel data of the specific pixel;

comparing means for comparing magnitudes of the differences calculated by said calculating means with a predetermined value;

Markov model coding means for encoding a difference between pixel data of the pixel to be coded and the pixel data of the specific pixel by the Markov model coding on the basis of the differences calculated by said calculating means;

predictive coding means for encoding the pixel to be coded by predictive coding on the basis of a predicted value based on the pixel data of the specific pixel and the reference pixels; and selecting means for selecting either said Markov model coding means or said predictive coding means to be used for encoding the pixel to be coded on the basis of a comparison result by said comparing means, wherein said Markov model coding performs different types of entropy coding in accordance with a plurality of conditions classified based on the neighboring pixels of the pixel to be coded.

4. The image encoding apparatus according to claim 3, further comprising means for encoding the difference between the pixel data of the pixel to be coded and the pixel data of the specific pixel by the Markov model coding and encoding the pixel to be coded by the predictive coding by using the pixel data of the specific pixel as a predicted value when a magnitude of the difference between the pixel data of the pixel to be coded and the pixel data of the specific pixel is equal to or greater than the predetermined value.

5. The image encoding apparatus according to claim 3, wherein the specific pixel is a pixel which is one pixel prior to the pixel to be coded in a raster scanning line.

6. The image encoding apparatus according to claim 3, wherein the neighboring pixels include pixels which are in a line prior to the line in which the pixel to be coded is included.

7. The image encoding apparatus according to claim 3 further comprising image filing means for inputting and storing an output code from said Markov model coding means and an output code from said predictive coding means.

* * * * *

UNITED STATES PATENT AND TRADEMARK OFFICE
CERTIFICATE OF CORRECTION

PATENT NO. : 6,031,938

DATED : February 29, 2000

INVENTOR(S) :

HIROSHI KAJIWARA

It is certified that error appears in the above-identified patent and that said Letters Patent is hereby corrected as shown below:

COLUMN 3:

Line 31, "(x-a)." should read --(x-a)--.

COLUMN 5:

Line 40, "is" should read --are--;
    Line 41, "else" should read --or else--;
    Line 42, "if" should be deleted;
    Line 50, "else if" should read --or else--; and
    Line 59, "FIG. 6" should read --FIG. 6.--.

COLUMN 6:

Line 4, "is" should read --are--;
    Line 15, "FIG. 9" should read --FIG. 9.--;
    Line 35, "S25" should read --S25.--; and
    Line 40, "probability" should read --probability of--.

COLUMN 7:

Line 12, "that" should be deleted.

COLUMN 10:

Line 51, "mage" should read --image--.

UNITED STATES PATENT AND TRADEMARK OFFICE
CERTIFICATE OF CORRECTION

PATENT NO. : 6,031,938

DATED : February 29, 2000

INVENTOR(S) : HIROSHI KAJIWARA

Page 2 of 2

It is certified that error appears in the above-identified patent and that said Letters Patent is hereby corrected as shown below:

<u>COLUMN 14</u>:

Line 57, "claim 3" should read --claim 3,--.

Signed and Sealed this

Fifteenth Day of May, 2001

Attest:

NICHOLAS P. GODICI

*Attesting Officer*   *Acting Director of the United States Patent and Trademark Office*